Figure 5:
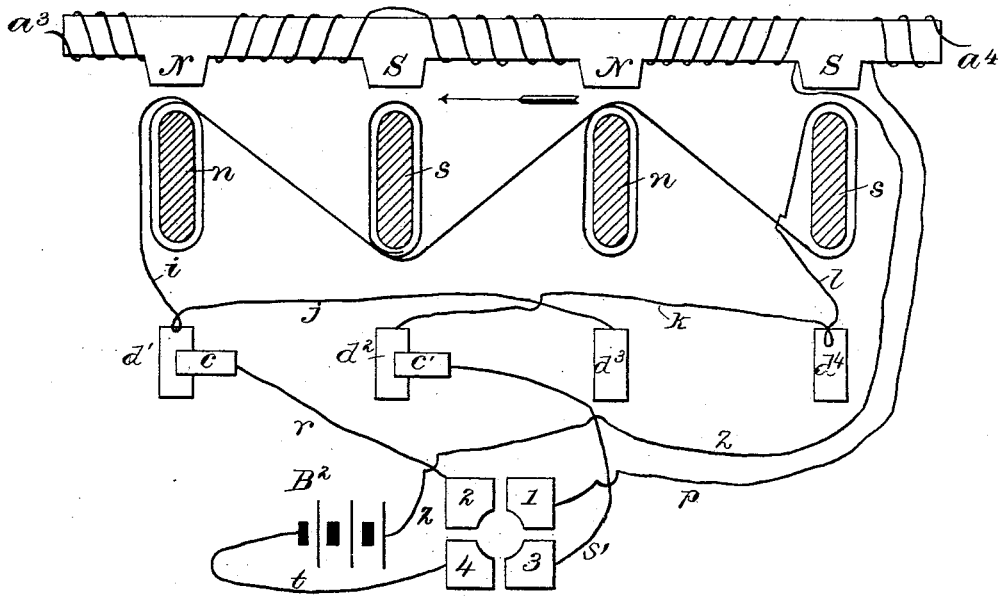

(No Model.) 2 Sheets—Sheet 1.
F. J. KELLER & J. W. CARNES.
ELECTRIC MOTOR.
No. 393,373. Patented Nov. 27, 1888.
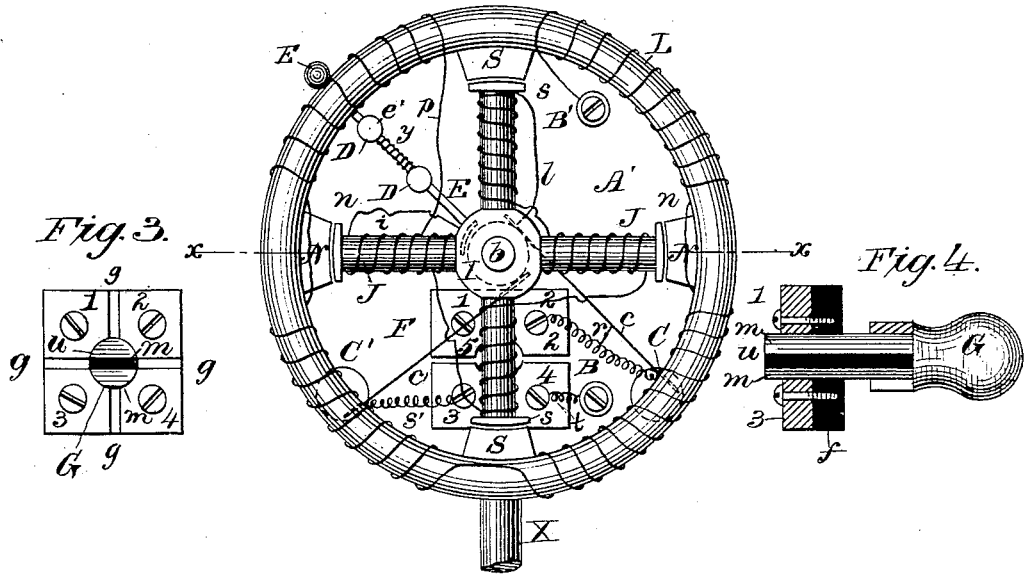
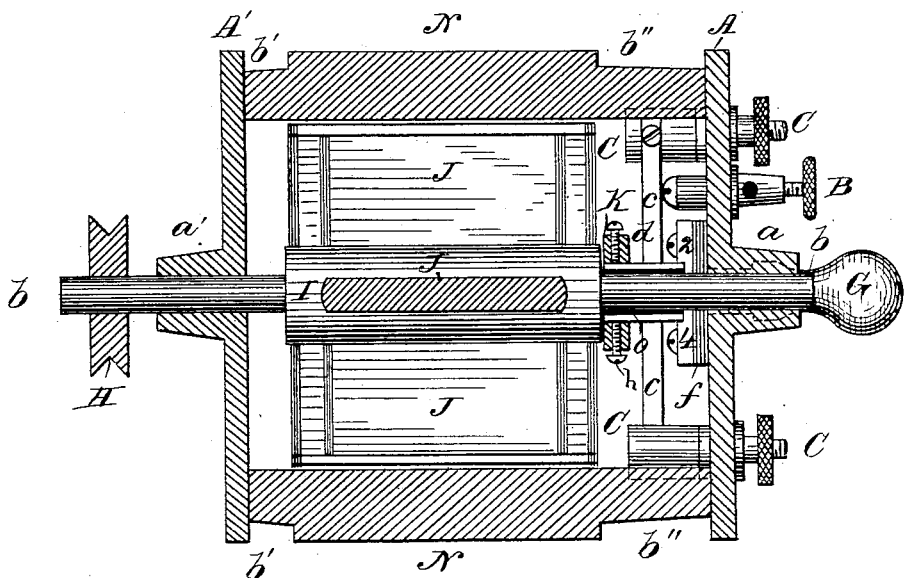
WITNESSES:
INVENTOR
F. J. Keller.
J. W. Carnes.
BY
ATTORNEY.

(No Model.) 2 Sheets—Sheet 2.

F. J. KELLER & J. W. CARNES.
ELECTRIC MOTOR.

No. 393,373. Patented Nov. 27, 1888.

WITNESSES:

INVENTOR.
F. J. Keller.
J. W. Carnes.
BY
ATTORNEY,

UNITED STATES PATENT OFFICE.

FRED J. KELLER AND JAMES W. CARNES, OF MASSILLON, OHIO.

ELECTRIC MOTOR.

SPECIFICATION forming part of Letters Patent No. 393,373, dated November 27, 1888.

Application filed January 24, 1888. Serial No. 261,767. (No model.)

*To all whom it may concern:*

Be it known that we, FRED J. KELLER and JAMES W. CARNES, citizens of the United States, and residents of Massillon, in the county of Stark and State of Ohio, have invented certain new and useful Improvements in Electric Motors, of which the following is a specification.

The object of our invention is to produce a motor which is compact, efficient, easy, and cheap to construct and operate, and which possesses various new and novel attachments for use in operating it, and which we describe hereinafter.

Our invention consists in an annular electro field-magnet having four poles, separated each ninety degrees from its neighbor on either side, and having their faces concentric with the circumferential line of rotation of an armature rotated within this field-magnet, an armature consisting of a central hub and four radial electro-magnetic arms therefor at right angles each to its neighbor, a commutator of peculiar construction, hereinafter described, a switch of peculiar construction, hereinafter described, for the purpose of reversing the relative polarity of the field and armature magnets to effect reversal of direction of motion, and a device for cleaning the commutator of the machine at will. These several devices we, under our invention, combine to form an electro-magnetic motor or a dynamo-electric machine.

The accompanying drawings are made for the purpose of further illustrating our invention as we now proceed to describe it, referring to the drawings by numbers and letters.

Figure 6:
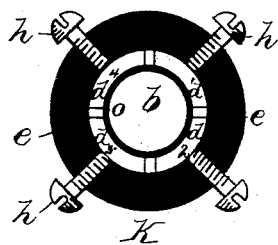
Figure 7:
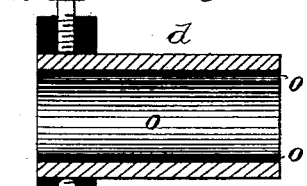
Figure 8:
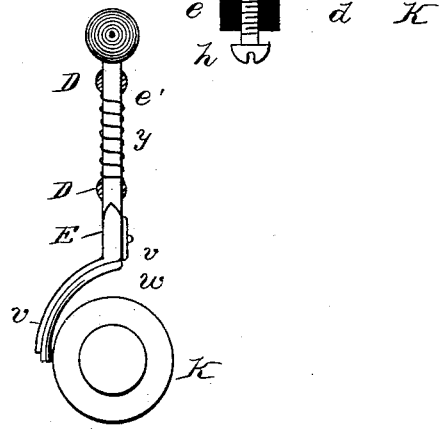

Figure 1 is an end view of one of our motors with the plate or disk A, Fig. 2, removed, but with the plate A' in place at the back. Fig. 2 is a longitudinal section of the field electro-magnet and disks which support the shaft of the armature and other devices. Fig. 3 is a face view of our switch-plate with its plug inserted. Fig. 4 is a longitudinal view of our plug in a sectional view of the switch-plate. Fig. 5 is a diagram showing the circuits of the machine when used as a motor. Fig. 6 is an enlarged end view of our commutator. Fig. 7 is an enlarged longitudinal section of our commutator. Fig. 8 is an enlarged view of our wiper used for cleaning the commutator.

A and A' are two disks of brass or other suitable non-magnetic material. The disk A' is fastened to the annular electro field-magnet by two projections or lugs, $b'$, from the field-magnet pole-faces N N. This disk has at its center a bearing, $a'$, for the shaft $b$ of the armature. The other disk, A, has a bearing, $a$, for the armature-shaft $b$, and is attached to the field-magnet by two lug-like extensions, $b''$, of the poles N N. It has attached to it, but suitably insulated, two binding-posts, B B', Fig. 1; two posts, C C', carrying commutator-springs $c$ $c'$; two posts or guides, D D, which support and guide the wiper E, and the switch-plate F, by means of which and the plug G the direction of rotation of the armature is determined.

On the armature-shaft is the pulley H, the iron hub I, carrying the radial iron arms J, and the commutator K.

The annular electro field-magnet L is so wound that like poles are diametrically opposite, as at N S N S, when electric current flows in the insulated wires wound on it. Only a few convolutions of wire are shown, it being obvious that any number of convolutions of any suitable size of wire may be used. The faces of the poles are by their curved form and inward projection brought as closely as possible to the line described by the polar ends N S N S of the armature during rotation.

The iron arms J of the armature are so wound with insulated wire that when electric current flows in it they are so magnetized that like poles are diametrically opposite, as at $n$ $s$ $n$ $s$.

The commutator, Figs. 6 and 7, is constructed as follows: On the shaft $b$ is a sleeve, $o$, of vulcanite or other suitable insulating material. On this sleeve a metal tube is fitted and then cut longitudinally into four equal segments, $d'$ $d^2$ $d^3$ $d^4$, with spaces between them. These segments are held in place by a ring, $e$, of vulcanite or other suitable insulating material, in which ring are four metal screws, $h$ $h$ $h$ $h$, which serve to bind the segments in place and to act as conductors of the currents to or from, as the case may be, the wires $i$ $j$ $k$ $l$.

The switch-plate, Fig. 3, is constructed as follows: On the square plate $f$, of vulcanite or other suitable insulating material, are screwed the four plates 1 2 3 4, of brass or other metal. These plates are separated from one another by the spaces $g\ g\ g\ g$. The round hole 5, intended to receive the plug G, is bored through the center corners of the brass plates, so that the plug may touch all the plates at those curved edges, partly bounding the hole. Plate 1 is electrically connected to the field-coils by wire $p$. Plate 2 is connected to one brush, $c$, by post C and wire $r$. Plate 3 is connected to the other brush by the other post C and wires $s'$, and plate 4 is connected to the battery by wire $t$ through binding-post B.

The plug, Fig. 4, is constructed as follows: The two segmental strips $m\ m$, of brass or other metal, are separated longitudinally by a strip, $n$, of vulcanite or other suitable insulating material, and the three strips are tightly socketed in the handle G, made of vulcanite or other suitable insulating material. It is plain that when this plug is inserted in the hole in the switch-plate it will electrically connect the four plates in two series of two each, and in an order dependent upon the position circumferentially of the brass strips. Fig. 3 shows the plates connected 1 to 2 and 3 to 4. By turning the plug the plates may be connected 1 to 3 and 2 to 4.

The wiper, Fig. 8, for cleaning the commutator, is constructed as follows: To one end of a rod, E, with a knob for convenience of handling, is fastened a spring, $v$, of sheet metal, bent approximately to the form of the periphery of the commutator. On the concave side of this spring is fastened a pad, $w$, of felt, cloth, or like absorptive material. Guide-posts D D, Fig. 1, are fastened to the disk A', and in holes bored in them the rod E slides, whenever moved by pressure, to bring the pad into contact with the commutator, and is returned by the spiral spring $y$, in obvious manner, when pressure is removed. The spring $v$ yields to the shape of the commutator, and the pad wipes off all oil and dirt which may be on the surface of the commutator. In use the wiper is pressed occasionally on the commutator while the machine is in motion.

The various parts by which the machine is manually operated—namely, the switch F, the two binding-posts B B, and the brush-holders or posts C C—are mounted on the disk A, so as to be held compactly together and readily accessible. They are all properly insulated from the disk and one another in obvious manner.

Fig. 5 illustrates in diagram the circuits. Let us suppose that the current starts from the battery $B^2$, passes through the wire $t$ to plate 4, from there by the plug to plate 3, from there by wire $s'$ to commutator-spring $c'$ on commutator-segment $d^2$ by wires $k$, $l$, and $i$, around the armature-arms $s\ n\ s\ n$ to commutator-segment $d'$, by springs $c$ and wire $r$ to plate 2, through the plug to plate 1, by wire $p$ around the field-magnet S N S N, and back by wire $z$ to the battery. The armature-poles S N S N will be repelled in the direction of the arrow by the like poles S N S N, and attracted by unlike poles until the commutator-segments $d^2$ and $d^3$ come under the springs just as the poles again come to the same radial lines when the polarity of the armature-arms is changed by the current taking a new course through their coils. This course is $t\ 4\ 3\ s'\ c'\ d^3$ $j\ i$, around armature $l\ k\ d^2\ c\ r\ 2\ 1$, and around the field-magnets, as before. When the next commutator-segment $d^4$ comes under spring $c'$, the course is $t\ 4\ 3\ s'\ c'\ d^4\ l$, around armature $i$ $j\ d^3\ c\ r\ 2\ 1$, and around the field-magnet, as before. When the next commutator-segment $d'$ comes under spring $c'$, the course of current is $t\ 4\ 3\ s'\ c'\ d'\ j\ i\ l\ d^4\ c\ r\ 2\ 1$, and around the field-magnet, as before. Now, to reverse the direction of rotation, rotate the plug in 5 until plates 4 and 2 and 1 and 3 are electrically connected, and the current will flow through $t\ 4\ 2\ r\ c$ $d'\ i$, around armature $l\ k\ d^2\ c'\ s'\ 3\ 1$, and around the field-magnet, as before. It will be noticed that this last position of the armature is the same as the first we have considered; but the current passes around the armature-arms in the reverse direction, and consequently magnetizing them reversely, so that the direction of rotation is reversed after well-known law. It is not necessary to rehearse the direction of the current for each stage of this reverse action, because it is obvious. We place the springs $c\ c'$ in relation to the commutator-segments so that the changes of polarity of the armature take place just on the radial lines of the field-magnet poles. The momentum acquired by rotation carries the armature past the neutral lines. In the diagram, Fig. 5, the ends $a^3\ a^4$ are supposed to be joined as they would be if the core were in ring form. The commutator-segments, which are diametrically opposite, are electrically connected, as is shown by the wire $j$, which connects segments 1 and 3, and the wire $k$, which connects 2 and 4.

Having described our invention, we hereby claim—

1. For the commutator of an electric machine, a wiping or cleaning device mounted on the machine so that it may be pressed into contact with the face of the commutator at will and recover its normal position away from such contact when the pressure is removed.

2. For the commutator of an electric machine, a wiping or cleaning device consisting of a spring-plate bent approximately to the circle of the commutator, a pad of absorptive fibrous material fastened to the concave side of the spring-plate, and a handle fastened to the spring-plate.

3. In a dynamo-electric machine or motor, two disks, as A and A', provided with bearings for the armature-shaft, and also supporting the field-magnet, a revolving armature located within the disks and the field-magnet, a commutator, also located within the field-magnet and disks, a pair of contact-brushes, and a spring-acted commutator-wiper, all located between the disks and field-magnet and mounted upon one of the disks, substantially as described.

4. In a dynamo-electric machine or motor, two disks, as A and A', provided with bearings for the armature-shaft, and also supporting the field-magnet, a revolving armature located within the disks and the field-magnet, a commutator, also located within the field-magnet and disks, a pair of contact-brushes, a spring-acted commutator-wiper, and a reversing-switch, all located between the disks and field and mounted upon one of the disks, as set forth.

5. A commutator-wiper consisting of a spring push-rod carrying a wiping-brush at one end and a handle or knob at the other, and located in close proximity to the commutator, and adapted to be pressed into contact with the commutator at will and recover its normal position away from the commutator when the pressure is removed.

6. A pair of disks supporting between them a field-magnet and armature, a commutator, contact-brushes, and a reversing device, the last-mentioned device being controlled from the outside by a plug inserted through one of the disks.

In witness whereof we have hereunto affixed our seals and signed our names in the presence of two subscribing witnesses.

FRED J. KELLER. [L. S.]
JAMES W. CARNES. [L. S.]

Witnesses:
M. ESTELLA McMILLAN,
MAY McMILLAN.